(12) United States Patent
Ritter

(10) Patent No.: US 12,479,123 B2
(45) Date of Patent: *Nov. 25, 2025

(54) PROCESS FOR PRODUCING SMOOTH STRAND-BASED SIDING OR STRUCTURAL PANELS

(71) Applicant: LOUISIANA-PACIFIC CORPORATION, Nashville, TN (US)

(72) Inventor: David C. Ritter, Franklin, TN (US)

(73) Assignee: LOUISIANA-PACIFIC CORP., Nashville, TN (US)

( * ) Notice: Subject to any disclaimer, the term of this patent is extended or adjusted under 35 U.S.C. 154(b) by 241 days.

This patent is subject to a terminal disclaimer.

(21) Appl. No.: 18/142,200

(22) Filed: May 2, 2023

(65) Prior Publication Data

US 2023/0264383 A1     Aug. 24, 2023

Related U.S. Application Data

(63) Continuation of application No. 15/803,771, filed on Nov. 4, 2017, now Pat. No. 11,639,011.
(Continued)

(51) Int. Cl.
*B27N 3/06* (2006.01)
*B27N 1/00* (2006.01)
(Continued)

(52) U.S. Cl.
CPC ............... *B27N 3/06* (2013.01); *B27N 1/006* (2013.01); *B27N 3/02* (2013.01); *B27N 3/143* (2013.01); *B27N 3/18* (2013.01); *B27N 7/00* (2013.01)

(58) Field of Classification Search
CPC . B27N 3/06; B27N 1/006; B27N 3/02; B27N 3/143; B27N 3/18; B27N 7/00; B27N 1/00; B32B 2260/028; B32B 7/12; B32B 21/02; B32B 2255/08; B32B 2255/12; B32B 2260/046; B32B 21/06; B32B 29/005; B32B 2607/00; B32B 37/02;
(Continued)

(56) References Cited

U.S. PATENT DOCUMENTS 2,399,338 A * 4/1946 Ford ..................... B29C 53/562
156/218
6,461,743 B1 * 10/2002 Tanzer ................... B27N 7/005
428/528

(Continued)

*Primary Examiner* — S. Behrooz Ghorishi
(74) *Attorney, Agent, or Firm* — Wayne Edward Ramage; Baker Donelson

(57) ABSTRACT

A process for producing a smooth-sided strand-based siding or wood structural panel using a pre-telegraphing process. The pre-telegraphing is performed after the primary process completes pressing and consolidation of the substrate/board. The pre-telegraphing process applies a water spray on the hot board immediately out of the primary process press, and before overlay application. The application of the water spray causes the surface of the board to swell and cure. A settling period follows to allow the top surface particles and strands to swell along with absorption and evaporation of the moisture. This is followed by surface sanding to remove the telegraphing and produce a smooth surface. This may then be followed by lamination of overlay(s). The process is completed by post-lamination treatment and coating of the board.

20 Claims, 3 Drawing Sheets

Related U.S. Application Data

(60) Provisional application No. 62/417,485, filed on Nov. 4, 2016, provisional application No. 62/554,608, filed on Sep. 6, 2017.

(51) Int. Cl.
    *B27N 3/02*     (2006.01)
    *B27N 3/14*     (2006.01)
    *B27N 3/18*     (2006.01)
    *B27N 7/00*     (2006.01)

(58) Field of Classification Search
    CPC ..... B32B 37/10; B32B 37/24; B32B 37/0038; B32B 37/06; B32B 37/144; E04C 2/16; E04C 2/246
    See application file for complete search history.

(56) References Cited

U.S. PATENT DOCUMENTS

| | | | |
|---|---|---|---|
| 11,639,011 B2 * | 5/2023 | Ritter | B27N 1/00 156/62.2 |
| 2008/0245493 A1 * | 10/2008 | Nishio | E04C 2/16 162/146 |
| 2016/0297096 A1 * | 10/2016 | Nijsse | B32B 27/10 |

\* cited by examiner

PROCESS FOR PRODUCING SMOOTH STRAND-BASED SIDING OR STRUCTURAL PANELS

This application is a continuation of U.S. patent application Ser. No. 15/803,771, filed Nov. 4, 2017, which claims benefit of and priority to U.S. Provisional Application No. 62/554,608, filed Sep. 6, 2017, and No. 62/417,485, filed Nov. 4, 2016, and is entitled to those filing dates for priority. The specification, figures, and complete disclosure of U.S. Provisional Applications Nos. 62/554,608 and 62/417,485 and U.S. patent application Ser. No. 15/803,771 are incorporated herein in their entireties by specific reference for all purposes.

FIELD OF INVENTION

This invention relates to a method and process for producing a smooth-sided strand-based siding or wood structural panel (such as OSB, oriented strand board, or manufactured or engineered wood).

SUMMARY OF INVENTION

In various embodiments, the present invention comprises an apparatus and related method or process for producing a smooth-sided strand-based siding or wood structural panel (such as OSB, oriented strand board, or manufactured or engineered wood) using a pre-telegraphing and/or secondary pressing process. The pre-telegraphing and/or secondary pressing process is performed after the primary process completes pressing and consolidation of the substrate/board. In several embodiments, the secondary process applies and cures an overlay after applying a water spray on the hot board immediately out of the primary process press, and before overlay application. The application of the water spray causes the surface of the board to swell (i.e., pre-telegraphing) and cure, thereby becoming "unsmooth" before laminating. A settling period follows to allow the top surface particles and strands to swell along with absorption and evaporation of the moisture. This is followed by surface sanding to remove the telegraphing and produce a smooth surface, which is then followed by lamination of the overlay(s). The process is completed by post-lamination treatment and coating of the board.

In several exemplary embodiments of a process in accordance with the present invention, strands from a siding or process plant are dried and stored. The strands are blended with chemicals and a mat is formed. In one exemplary embodiment, there are three or more layers of strands at a moisture content of approximately 2% to approximately 10%, each layer being oriented, and the strands treated with a sizing agent (e.g., wax, such as an emulsion or slack wax), a resin (such as pMDI or PF), and a preservative (such as zinc borate).

Cellulosic fines (which may be treated with chemicals and additives) are applied to the top of the mat, and water and chemicals are applied to the top of the fines before primary pressing (i.e., heat and pressure) is applied to the mats to form boards (or panels) of a desired or targeted thickness and/or density. In one exemplary embodiment, a fine layer of wood particles are applied to form a layer weighing between approximately 0.05 to approximately 0.40 lbs/ft$^2$, the fines being treated with a sizing agent, resin and preservative (as described above with regard to the strands), and with the strands and fines being of a weight such that the pressed density of the wood composite is approximate 33 to approximately 44 lbs/cubic foot.

The boards are trimmed to form master panels or blanks (with fines from the process sent to fines storage and chemical treatment). A water spray (which also may include chemicals or hydrophobic agents, such as wax) is applied to the master blanks, causing the surface of the board to swell (i.e., pre-telegraphing). In one exemplary embodiment, the application of the water spray is such that the moisture content of the master blank is elevated by up to approximately 3% moisture content.

The master blanks are covered and stored during a settling period to allow the top surface particles and strands to swell along with absorption and evaporation of the moisture. In one exemplary embodiment, the settling period is fourteen days or less. The top surface of each master blanks is then sanded, which removes imperfections in the top surface that have pre-telegraphed as described above, and then an overlay or overlays are applied to the top surface. In several embodiments, the overlay(s) are pressed/adhered to the surface of the sanded master blank through the application of heat and pressure during a secondary pressing process. In one exemplary embodiment, the secondary hot-press has platen surfaces no greater than approximately 450 degrees F. One or more overlays can be applied. If multiple overlays are applied, the first overlay can act as a "cushion" to further reduce the likelihood of telegraphing, while the second or final overlay serves as the finished surface of the panel.

Blanks are then subject to final product processing (i.e., cut to size, edges primed, packaged) for production of the finished product for shipment. Fines from this final product processing also are sent to fines storage.

The pre-telegraphing and/or secondary pressing process described here is applicable to various forms of panels and siding, including, but not limited to, lap and panel siding, soffit, and trim.

DETAILED DESCRIPTION OF EXEMPLARY EMBODIMENTS

In various exemplary embodiments, the present invention comprises a method or process, and associated apparatus, for producing a smooth-sided strand-based siding or wood structural panel (such as OSB, oriented strand board, or manufactured or engineered wood) using a pre-telegraphing and/or secondary pressing process. The pre-telegraphing and/or secondary pressing process is performed after the primary process completes pressing and consolidation of the substrate/board. Examples of primary processes are described in U.S. Pat. Nos. 6,461,743; 5,718,786; 5,525,394; 5,470,631; and 5,425,976; all of which are incorporated herein in their entireties by specific reference for all purposes.

In several embodiments, the secondary process applies and cures the overlay after applying a water spray on the hot board immediately out of the primary process press, and before overlay application. The application of the water spray causes the surface of the board to swell (i.e., pre-telegraphing) and cure, thereby becoming "unsmooth" before laminating. A settling period follows to allow the top surface particles and strands to swell along with absorption and evaporation of the moisture. This is followed by surface sanding to remove the telegraphing and produce a smooth surface, which is then followed by lamination of the overlay(s). The process is completed by post-lamination treatment and coating of the board.

Figure 1:
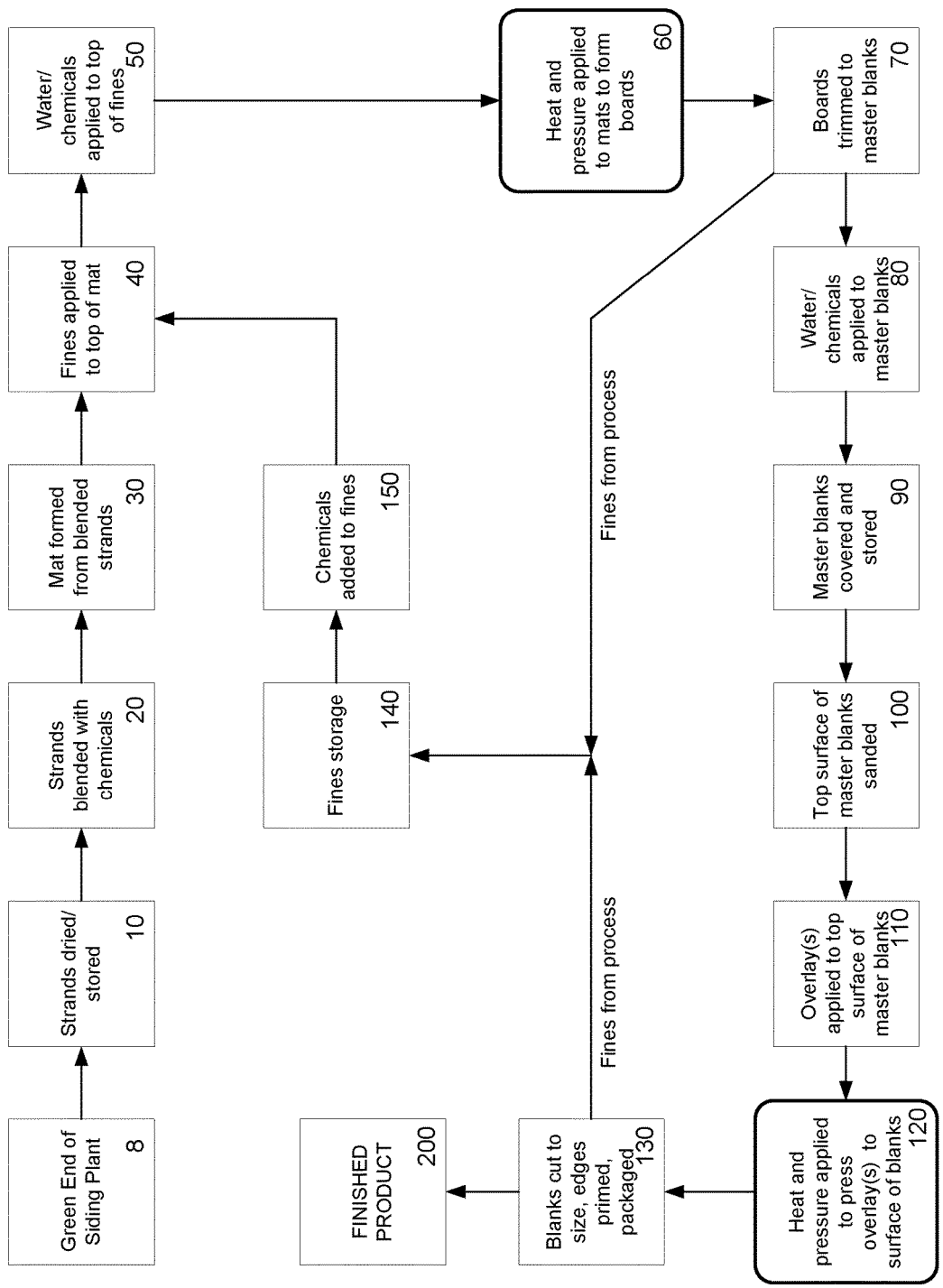
FIG. 1 shows a view of a primary and second pressing process in accordance with an embodiment of the present invention.

FIG. 1 shows an overview of a process in accordance with the present invention. Strands from a siding or process plant 8 are dried and stored 10. The strands are blended with chemicals 20 and a mat is formed 30. In one exemplary embodiment, there are three or more layers of strands at a moisture content of approximately 2% to approximately 10%, each layer being oriented, and the strands treated with a sizing agent (e.g., wax, such as an emulsion or slack wax), a resin (such as pMDI or PF), and a preservative (such as zinc borate).

Cellulosic fines (which may be treated with chemicals and additives 150) are applied to the top of the mat 40, and water and chemicals are applied to the top of the fines 50 before primary pressing (i.e., heat and pressure) is applied to the mats to form boards (or panels) 60 of a desired or targeted thickness and/or density. In one exemplary embodiment, a fine layer of wood particles are applied to form a layer weighing between approximately 0.05 to approximately 0.40 lbs/ft$^2$, the fines being treated with a sizing agent, resin and preservative (as described above with regard to the strands), and with the strands and fines being of a weight such that the pressed density of the wood composite is approximate 33 to approximately 44 lbs/cubic foot.

The boards are trimmed to form master panels or blanks 70 (with fines from the process sent to fines storage 140 and chemical treatment 150). A water spray (which also may include chemicals or hydrophobic agents, such as wax) is applied to the master blanks 80, causing the surface of the board to swell (i.e., pre-telegraphing). In one exemplary embodiment, the application of the water spray is such that the moisture content of the master blank is elevated by up to approximately 3% moisture content.

The master blanks are covered and stored during a settling period 90 to allow the top surface particles and strands to swell along with absorption and evaporation of the moisture. In one exemplary embodiment, the settling period is fourteen days or less. The top surface of each master blanks is then sanded 100, which removes imperfections in the top surface that have pre-telegraphed as described above, and then an overlay or overlays are applied to the top surface 110. The overlay(s) are pressed/adhered to the surface of the sanded master blank through the application of heat and pressure during a secondary pressing process 120. In one exemplary embodiment, the secondary hot-press has platen surfaces no greater than approximately 450 degrees F. One or more overlays can be applied. If multiple overlays are applied, the first overlay can act as a "cushion" to further reduce the likelihood of telegraphing, while the second or final overlay serves as the finished surface of the panel.

Blanks are then subject to final product processing (i.e., cut to size, edges primed, packaged) 130 for production of the finished product 200 for shipment. Fines from this final product processing also are sent to fines storage 140.

The secondary pressing process described here is applicable to various forms of panels and siding, including, but not limited to, lap and panel siding, soffit, and trim. The process is applied to the top surface in the case of lap and panel siding and soffit. The process may be applied to the back surface of trim, which ultimately produces a reversible trim finished product with a textured side (pressed in the primary pressing) and a smooth side of the back of the trim with an overlay (pressed in the secondary pressing process described above). That is, the textured surface can be pressed into one surface of the panel, and then the other surface subsequently sprayed with water and stored and treated as described above, thereby resulting in a wood composite product finished with overlays or textures on both main surfaces: a textured surface on one side, and a smooth surface (with or without overlay) on the other side.

The term "overlay" includes any form of overlay applied to a pressed board, including, but not limited to, a Kraft paper overlay. In several embodiments, the overlay comprises a saturating grade Kraft paper overlay saturated with a variety of chemicals, including, but not limited to, a phenolic resin or phenol formaldehyde. A prime coat of paint also may be applied to the overlay. A glue line (such as a phenol formaldehyde) may be used to facilitate adhesion of the overlay to the substrate/board.

In several embodiments, two overlays are used. A first overlay, or "cushion sheet," is placed on top of the fines layers to bridge any minor defects that may appear on the pressed board surface. In several embodiments, the cushion sheet comprises a saturated phenolic overlay approximately 32 lbs. to 90 lbs. in weight. While the cushion sheet usually would not be primed, it may be primed in some embodiments. The second overlay is placed on top of the "cushion sheet," and is preferably primed, but may also be unprimed. In several embodiments, the second overlay weighs from approximately 70 lbs. to 132 lbs.

Figure 2:
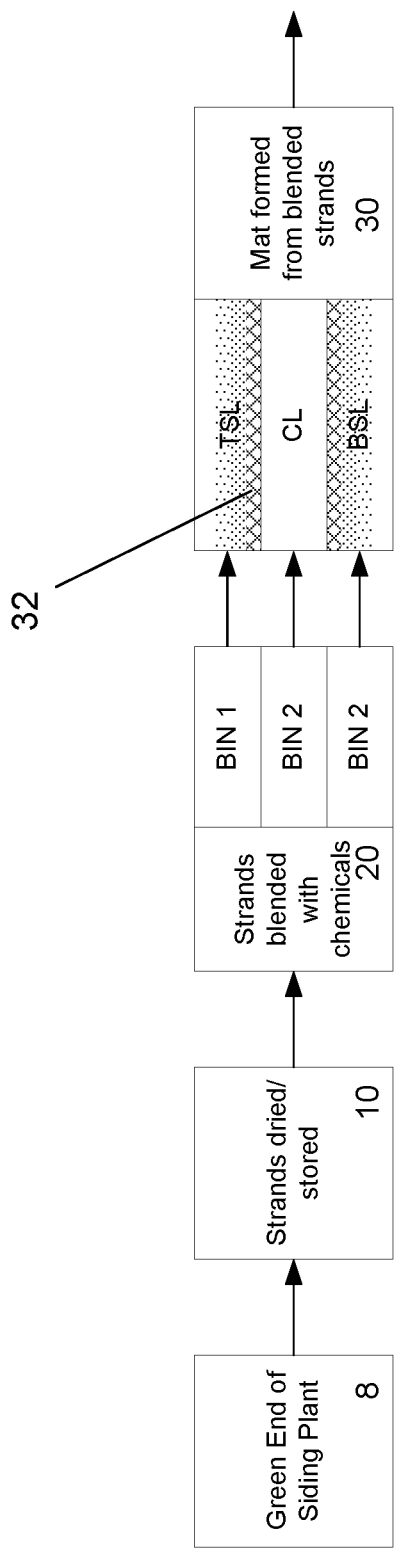
FIG. 2 shows a view of a process for multiple strand layering in forming a manufactured wood mat.

In several embodiments, as seen in FIG. 2, the present invention changes the normal layering of strands in the blending and matting process. In the blending and matting process, resin, wax, and/or a preservative are added to the stands and the strands are diverted to three or more forming bins. Where three bins are used, one forming bin is for the top surface layer (TSL) of the mat, one forming bin is the bottom surface layer (BSL) of the mat, and the third forming bins is for the center core layer (CL) of the mat.

The CL of the mat typically constitutes about 40 to 50% of the total mat weight, although it may be outside that range for certain embodiments. The remaining weight is distributed between the TSL and BSL. In some embodiments, the weight percentage of the TSL and BSL may be approximately equal, although the TSL may also have a lower or higher weight percentage than the BSL, depending on the type of board and material. In one exemplary embodiment, the TSL/CL/BSL weight percentages are approximately 30%/40%/30%.

Typically, the strands in the TSL and BSL are oriented in the "machine direction" (i.e., parallel to the direction of the process line flow), while strands in the CL are oriented "cross-machine direction" (i.e., perpendicular to the direction of process line flow). The degree of orientation of the layers of the mat can be modified by changing the elevation of the forming heads as they relate to the distance of the forming head from the forming wire or the last formed layer of the mat. Further, the strands in the TSL and BSL typically are layered in such a manner that the largest strands are situated more closely to the surface of the mat, and the finer strands are situated more internally in the mat. This arrangement maximizes the resulting panel stiffness and strength with respect to the "machine direction." This process is accomplished by manipulating the spacing of the disks in the forming heads, and the direction in which the disks are rotating.

In several embodiments of the present invention, the TSL strands are deposited such that the largest strands 32 are deposited first with respect to the TSL strands (i.e., more internally, adjacent to the CL), while finer and smaller strands are subsequently deposited over the larger strands (i.e., the finer and smaller strands thus are situated closer to or at the surface of the TSL). As the larger strands are more likely to produce "telegraphing" on the surface, the covering of the larger strands by the finer strands substantially reduces the amount of surface telegraphing during the claimed process.

Similarly, in embodiments where the BSL surface is expected to undergo the smoothing siding process of the present invention, the BSL strands are deposited such that the largest strands are deposited last with respect to the BSL strands (i.e., more internally, adjacent to the CL), after the finer and smaller strands are initially deposited. In this arrangement, the finer and smaller strands are situated closer to or at the resulting surface of the BSL.

The fines overlay is added to the top of the mat as described above, and the processes for primary or secondary pressing proceeds. The panel is pressed, and appropriate post-press finishing steps are performed.

Figure 3:
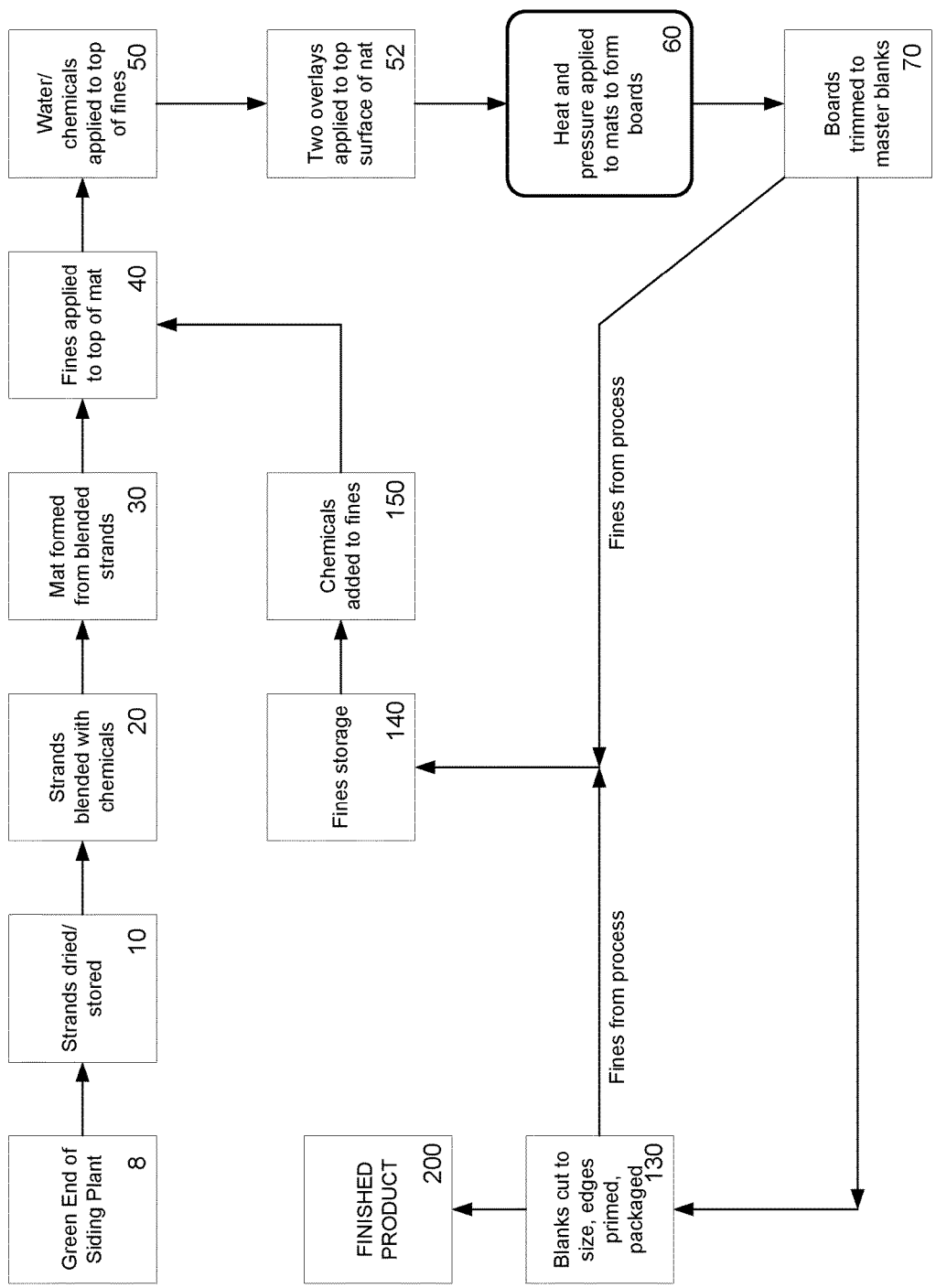
FIG. 3 shows a view of a primary only pressing process in accordance with another embodiment of the present invention.

In yet another embodiment of the present invention, smooth siding is achieved via primary pressing only (i.e., with no secondary pressing). As seen in FIG. 3, after the mat is formed as described above (see FIG. 2), two overlays 52 as described above are added to the mat prior to primary pressing. A first overlay, or "cushion sheet," is placed on top of the fines layers to bridge any minor defects that may appear on the pressed board surface. In several embodiments, the cushion sheet comprises a saturated phenolic overlay approximately 32 lbs. to 90 lbs. in weight. While the cushion sheet usually would not be primed, it may be primed in some embodiments. The second overlay is placed on top of the "cushion sheet," and is preferably primed, but may also be unprimed. In several embodiments, the second overlay weighs from approximately 70 lbs. to 132 lbs. The panel is then subjected to primary pressing 60 with or without a "minor" texture, and the post-press finishing steps described above are completed.

Thus, it should be understood that the embodiments and examples described herein have been chosen and described in order to best illustrate the principles of the invention and its practical applications to thereby enable one of ordinary skill in the art to best utilize the invention in various embodiments and with various modifications as are suited for particular uses contemplated. Even though specific embodiments of this invention have been described, they are not to be taken as exhaustive. There are several variations that will be apparent to those skilled in the art.

What is claimed is:

1. A manufacturing process for producing a smooth-sided strand-based product, comprising the steps of:
    blending cellulosic strands with one or more additives or chemicals;
    forming a mat with a first surface and a second surface from said cellulosic strands;
    applying heat and pressure to the mat in a primary pressing process to form a board;
    during the primary pressing process, pressing a texture in the second surface of the mat;
    trimming the board to form a master blank;
    while the master blank is still heated from the primary pressing process, and prior to application of one or more overlays to a surface of the master blank, pre-telegraphing the cellulosic strands in the first surface of the master blank by causing said cellulosic strands to swell, wherein the step of pre-telegraphing comprises causing the cellulosic strands in the first surface to swell by applying a water-based spray to said surface sufficient to elevate the moisture content of the master blank to approximately 3% moisture content, wherein the water-based spray comprises water and one or more chemicals or hydrophobic agents; and
    storing the master blank for a settling period of approximately 14 days to allow said cellulosic strands to swell; and
    after the settling period, and prior to application of one or more overlays to the pre-telegraphed surface of the master blank, removing imperfections in the pre-telegraphed surface by sanding the pre-telegraphed surface.

2. The manufacturing process of claim 1, further comprising applying a plurality of cellulosic fines to a surface of the mat prior to the primary pressing process.

3. The manufacturing process of claim 1, wherein forming the mat from said cellulosic strands comprises first forming a bottom surface layer of cellulosic strands, then forming a center core layer over the bottom surface layer, then forming a top surface layer over the center core layer.

4. The manufacturing process of claim 3, wherein the cellulosic strands forming the top surface layer differ in size between larger and finer, and forming the top surface layer comprises depositing the larger cellulosic strands first so that finer cellulosic strands are situated more closely to the top surface of the mat.

5. The manufacturing process of claim 3, wherein the cellulosic strands forming the bottom surface layer differ in size between larger and finer, and forming the bottom surface layer comprises depositing the finer cellulosic strands first so that finer cellulosic strands are situated more closely to the bottom surface of the mat.

6. The manufacturing process of claim 3, wherein the cellulosic strands in the center core layer comprise from about 40% to about 50% of total mat weight.

7. The manufacturing process of claim 3, wherein the cellulosic strands in the center core layer comprises approximately 40% of total mat weight, the cellulosic strands in the bottom surface layer comprise approximately 30% of total mat weight, and the cellulosic strands in the top surface layer comprise approximately 30% of total mat weight.

8. The manufacturing process of claim 3,
    wherein the primary pressing process has a direction of process line flow;
    wherein the cellulosic strands in each layer have an orientation with the respect to the direction of process line flow, such that
        the cellulosic strands in the bottom surface layer are oriented parallel to the direction of process line flow;
        the cellulosic strands in the center core layer are oriented perpendicular to the direction of process line flow; and
        the cellulosic strands in the top surface layer are oriented parallel to the direction of process line flow.

9. The manufacturing process of claim 1, further comprising applying one or more overlays to the pre-telegraphed surface of the master blank.

10. The manufacturing process of claim 9, wherein two overlays are applied, first a cushion overlay to reduce further telegraphing of the first surface, and then a final overlay as a finished surface over the cushion overlay.

11. The manufacturing process of claim 10, wherein the cushion overlay comprises a saturated phenolic overlay.

12. The manufacturing process of claim 10, wherein the cushion overlay is primed.

13. The manufacturing process of claim 10, wherein the final overlay is primed.

14. The manufacturing process of claim 9, further comprising applying heat and pressure in a secondary pressing process to adhere the one or more overlays to the pre-telegraphed surface of the master blank.

15. The manufacturing process of claim 14, wherein the secondary pressing process uses a platen surface temperature no greater than approximately 450 degrees F.

16. The manufacturing process of claim 1, further comprising processing the master blank after sanding the pre-telegraphed surface to produce a finished panel.

17. The manufacturing process of claim 1, wherein the smooth-sided strand-based product comprises a structural panel.

18. The manufacturing process of claim 1, wherein the smooth-sided strand-based product comprises a strand-based siding.

19. The manufacturing process of claim 18, wherein the strand-based siding comprises a soffit, trim, lap siding, and/or panel siding.

20. The manufacturing process of claim 1, wherein the smooth-sided strand-based product comprises oriented strand board.

* * * * *